United States Patent
Shibuya

(10) Patent No.: US 8,559,078 B2
(45) Date of Patent: Oct. 15, 2013

(54) COLORIMETRIC CHART AND COLOR REPRODUCTION ESTIMATING DEVICE

(75) Inventor: Takeshi Shibuya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 332 days.

(21) Appl. No.: 12/923,325

(22) Filed: Sep. 15, 2010

(65) Prior Publication Data

US 2011/0063697 A1 Mar. 17, 2011

(30) Foreign Application Priority Data

Sep. 15, 2009 (JP) ................................. 2009-213109
Sep. 7, 2010 (JP) ................................. 2010-200046

(51) Int. Cl.
G06K 15/00 (2006.01)
G03F 3/08 (2006.01)
G03G 15/00 (2006.01)

(52) U.S. Cl.
USPC ............. 358/505; 358/1.14; 358/518; 399/49

(58) Field of Classification Search
USPC ................................................ 358/505, 518
See application file for complete search history.

(56) References Cited

U.S. PATENT DOCUMENTS

| | | | | |
|---|---|---|---|---|
| 6,750,993 B1* | 6/2004 | Shirai | ............................. | 358/504 |
| 7,390,073 B2* | 6/2008 | Bailey et al. | .................... | 347/19 |
| 8,289,576 B2* | 10/2012 | Agehama | ....................... | 358/1.9 |
| 8,335,013 B2* | 12/2012 | Quach | ............................. | 358/1.9 |
| 2002/0048056 A1* | 4/2002 | Kubo | ............................. | 358/518 |
| 2005/0135822 A1* | 6/2005 | Nakagawa | ....................... | 399/49 |
| 2005/0248801 A1* | 11/2005 | Miyahara et al. | ............ | 358/1.14 |
| 2008/0043299 A1* | 2/2008 | Ikeda | ............................. | 358/518 |
| 2009/0231644 A1* | 9/2009 | Fukuhara | ....................... | 358/518 |
| 2009/0244573 A1* | 10/2009 | Seto | ................................. | 358/1.9 |

FOREIGN PATENT DOCUMENTS

| | | |
|---|---|---|
| JP | 3155765 | 4/2001 |
| JP | 2006-106556 | 4/2006 |
| JP | 2007-264364 | 10/2007 |

OTHER PUBLICATIONS

Abstract of JP 04-267270 published on Sep. 22, 1992.

* cited by examiner

*Primary Examiner* — Marivelisse Santiago-Cordero
*Assistant Examiner* — Moustapha Diaby
(74) *Attorney, Agent, or Firm* — Harness, Dickey & Pierce, P.L.C.

(57) ABSTRACT

A colorimetric chart, for measuring a color reproduction characteristic of an image forming apparatus, includes: a patch column that is arranged in a sub-scanning direction representing a conveying direction in which the image forming apparatus conveys the colorimetric chart and that is used in detecting periodic color fluctuation attributed to the image forming apparatus, wherein the patch column includes patches that are arranged in different phases on the same patch column.

12 Claims, 11 Drawing Sheets

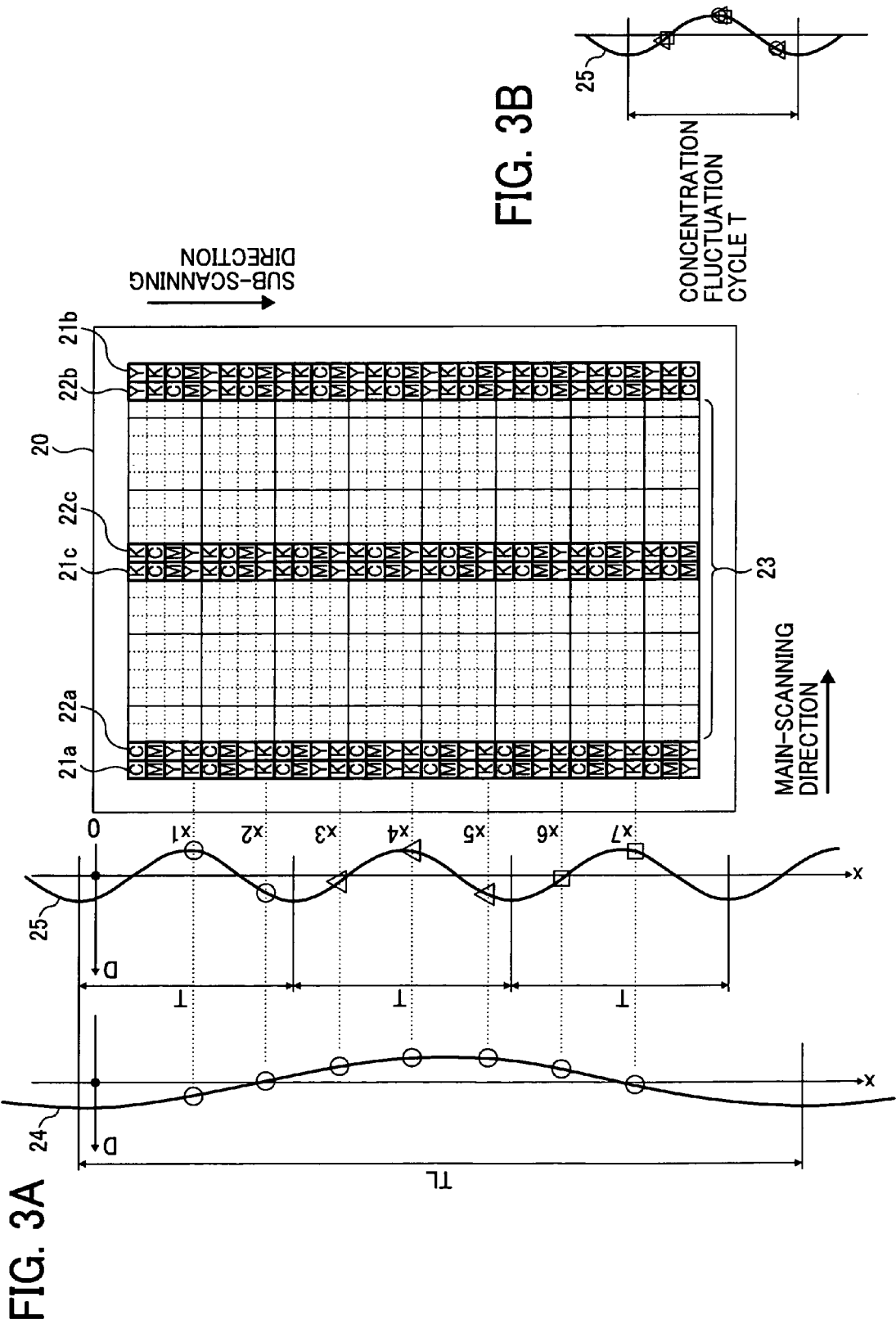

FIG. 6A
FIG. 6B
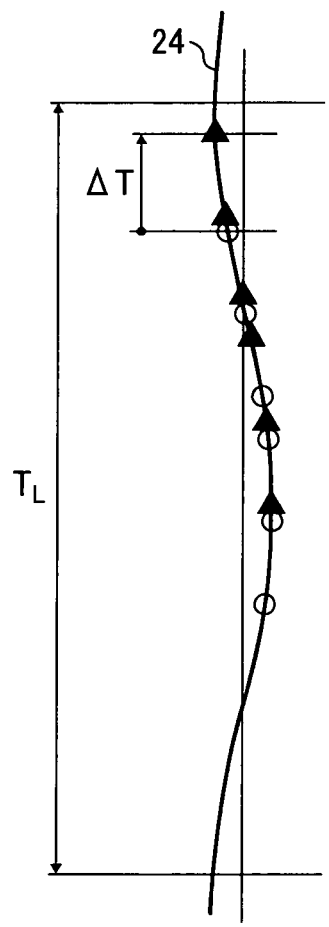
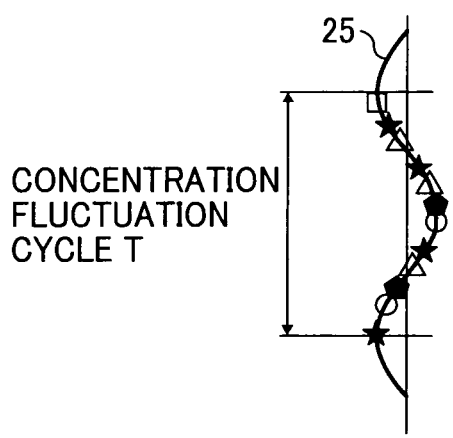
CONCENTRATION FLUCTUATION CYCLE T

COLORIMETRIC CHART AND COLOR REPRODUCTION ESTIMATING DEVICE

CROSS-REFERENCE TO RELATED APPLICATIONS

The present application claims priority and incorporates by reference the entire contents of Japanese Patent Application No. 2009-213109 filed in Japan on Sep. 15, 2009 and Japanese Patent Application No. 2010-200046 filed in Japan on Sep. 7, 2010.

BACKGROUND OF THE INVENTION

1. Field of the Invention

The present invention relates to a colorimetric chart, and a color reproduction estimating device.

2. Description of the Related Art

In image forming apparatuses such as printers or multi-function products, in order to form a surface image on a target medium for image formation, the medium is moved in a direction (sub-scanning direction) that is perpendicular to a constant direction (main-scanning direction) in which an image is formed in a linear manner or a belt-like manner. At that time, periodical concentration fluctuation, attributed to the configuration of the image forming apparatus, occurs in the sub-scanning direction.

Such concentration fluctuation in the sub-scanning direction becomes the cause of a measuring error regarding a colorimetric chart used in gradation characteristic calibration or regarding a colorimetric chart used in obtaining a color reproduction characteristic model that enables performing color management.

Generally, in office printers, electrophotographic photosensitive drums having diameter in the range of about $\phi 30$ mm to $\phi 40$ mm are used; while in high-speed printers of the 100 ppm category (where ppm stands for page per minute), electrophotographic photosensitive drums having diameter in the range of about $\phi 60$ mm to $\phi 100$ mm are used. Thus, in synchronization with the eccentricity of the photosensitive drums, the concentration fluctuation in the sub-scanning direction occurs in the range of about 90 mm to 300 mm. That is, for the width of 297 mm in A4 portrait format, about 1 to 3 cycles of periodic fluctuation occurs (for A4 landscape format), and about 0.5 to 1.5 cycles of periodic fluctuation occurs (for portrait format).

From among the periodic concentration fluctuation occurring on a formed image, the fluctuation components of the short-term concentration fluctuation in the order of a few mm can be eliminated to an extent by the randomization of measurement patch arrangement or by performing the statistical processing. That helps in reducing the abovementioned measuring error regarding a colorimetric chart.

Meanwhile, regarding the long-term concentration fluctuation having the cycle of several tens of pages, a colorimetric chart having the total color measurement of about 1 to 4 pages can be used so that it becomes possible to obtain a model for estimating color reproducibility for the measurement data. However, regarding the medium-term concentration fluctuation of about several cycles within one page, randomization of the patch arrangement that constitutes a chart does not result in sufficient elimination of the fluctuation components. Moreover, sufficient uniformity is also not achieved for modeling the color reproduction characteristic.

Japanese Patent Application Laid-open No. 2007-264364 can be cited as a conventional technique for tackling the issue of periodical concentration fluctuation in the sub-scanning direction. In Japanese Patent Application Laid-open No. 2007-264364, at the half cycle of the concentration fluctuation cycle, patches specified to have the same concentration gradation value are arranged and are to be measured so as to counterbalance the amount of periodical fluctuation in the sub-scanning direction of the concentration to be managed.

However, in the technique disclosed in Japanese Patent Application Laid-open No. 2007-264364, although the effect of fluctuation can be eliminated by averaging the concentration detection value detected at the half cycle of the fluctuation cycle, it is not possible to estimate and correct the periodic fluctuation.

SUMMARY OF THE INVENTION

It is an object of the present invention to at least partially solve the problems in the conventional technology.

According to an aspect of the present invention, there is provided a colorimetric chart for measuring a color reproduction characteristic of an image forming apparatus, including: a patch column that is arranged in a sub-scanning direction representing a conveying direction in which the image forming apparatus conveys the colorimetric chart and that is used in detecting periodic color fluctuation attributed to the image forming apparatus, wherein the patch column includes patches that are arranged in different phases on the same patch column.

According to another aspect of the present invention, there is provided a colorimetric chart for measuring a color reproduction characteristic of an image forming apparatus that includes a photosensitive drum, the colorimetric chart including: a patch column that is arranged in a sub-scanning direction representing a conveying direction in which the image forming apparatus conveys the colorimetric chart and that is used in detecting periodic color fluctuation attributed to the image forming apparatus, wherein the patch column includes a plurality of patches of different colors, and the plurality of patches are either arranged in a repeating fashion according to a non-integral cycle of a ratio Rt between a drum cycle of the photosensitive drum and the patch cycle of the plurality of patches of different colors or, when the ratio Rt is approximated to an integer equal to or smaller than five, arranged in a repeating fashion according to a cycle of the ratio Rt and in different phases.

According to still another aspect of the present invention, there is provided a color reproduction estimating device for estimating a color reproduction characteristic of an image forming apparatus that forms a color image on a printing medium by superimposing a plurality of basic colors based on image data, the color reproduction estimating device comprising: a colorimetric unit for measuring a patch color characteristic of a colorimetric chart that is output by the image forming apparatus, that includes a patch column arranged in a sub-scanning direction representing a conveying direction in which the image forming apparatus conveys the colorimetric chart, used in detecting periodic color fluctuation attributed to the image forming apparatus and that includes a colorimetric patch area; and an estimating unit for converting, based on an internal parameter configured based on a measurement value obtained by measuring the patch color characteristic, the measurement value of the colorimetric patch area measured by the colorimetric unit into an intermediate parameter that does not undergo a scale change due to concentration fluctuation and for estimating, based on the intermediate parameter and the internal parameter, reproduced colors of the image forming apparatus, wherein from a color attribute value included in the patch color characteristic measured by the colorimetric unit, the estimating unit estimates phase, amplitude, and offset of a color attribute fluctuation component of a basic color synchronizing with a particular cycle, and corrects the intermediate parameter obtained by conversion from a patch input value of the colorimetric patch area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B illustrate a first example of a colorimetric chart according to the present embodiment;

FIGS. 6A and 6B illustrate the sample points on a concentration fluctuation curved line that are plotted superimposedly on the same cycle

DETAILED DESCRIPTION OF THE PREFERRED EMBODIMENTS

Exemplary embodiments according to the present invention are described in detail below with reference to the accompanying drawings. The present invention is not limited to these exemplary embodiments.

Figure 11:
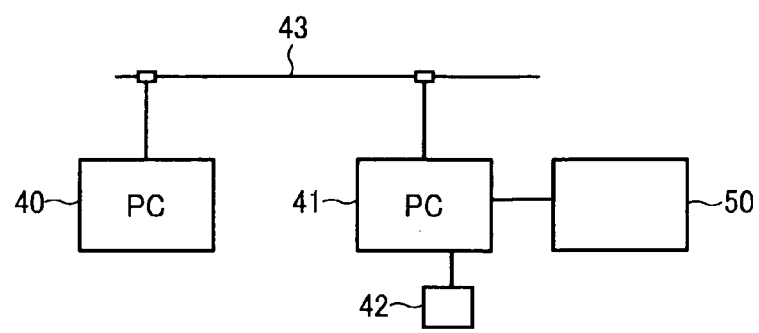
FIG. 11 illustrates a system configuration including the image forming apparatus that is the target for measurement according to the present embodiment.

FIG. 11 illustrates a system configuration including an image forming apparatus 50 that is the target for measurement according to the present embodiment. The image forming apparatus 50 is connected to a network 43 via an administrator PC 41 that also functions as an image processing device. That is, the administrator PC 41 performs an image processing operation (described later) on original data that is received from a user PC 40, which is also connected to the network 43, and then sends the processed data to the image forming apparatus 50. Besides, to the administrator PC 41 is connected a colorimetric device 42 that is used for gradation characteristic calibration or used for measuring the color reproduction characteristic of the image forming apparatus 50.

Figure 1:
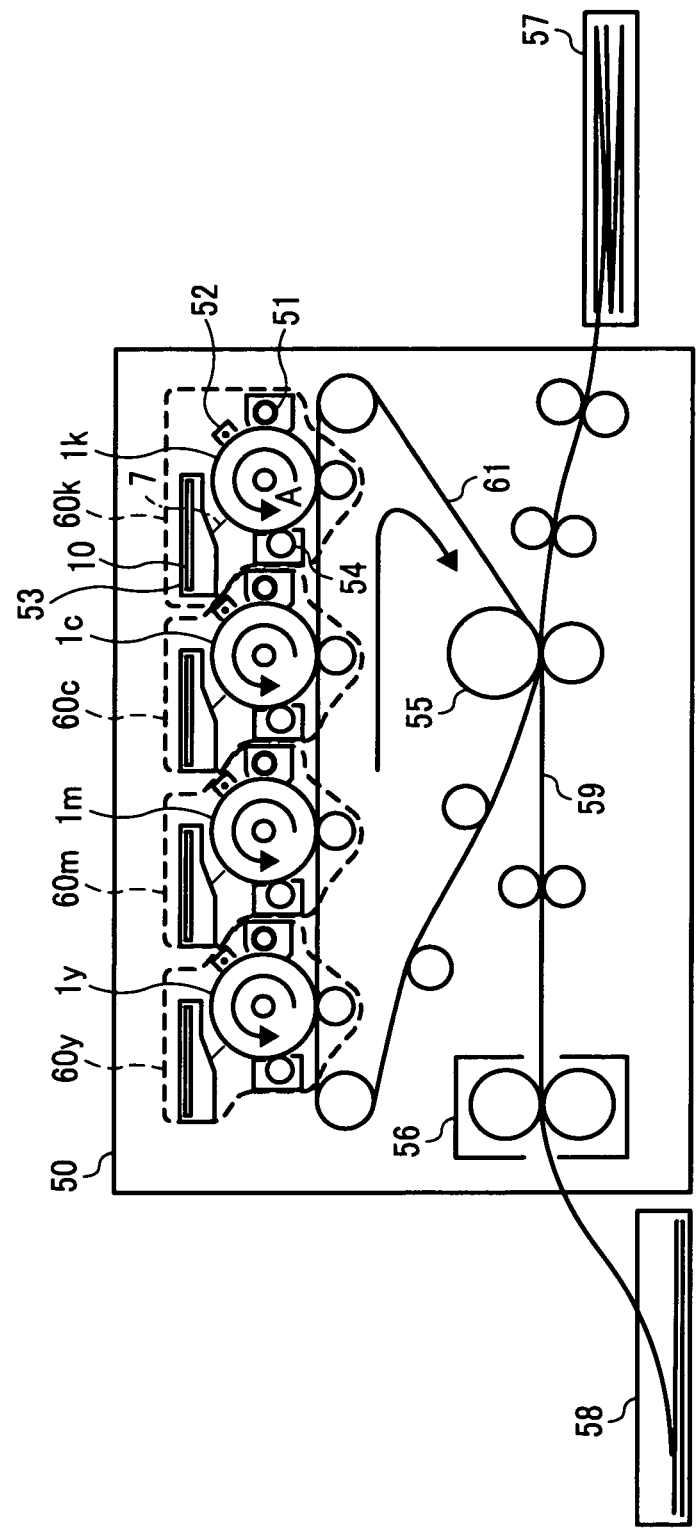
FIG. 1 illustrates an exemplary configuration of a laser printer as an example of an image forming apparatus according to an embodiment of the present invention.

FIG. 1 illustrates an exemplary configuration of a laser printer as an example of the image forming apparatus 50. To start with, explained below is the configuration and operations of a developing unit 60k.

A photosensitive drum 1k rotates in the direction of an arrow A illustrated in FIG. 1. On the surface of the photosensitive drum 1k that has been cleaned by a cleaning roller 51, a charger 52 applies a uniform charge. Then, a laser beam 7 emitted by a laser unit 53 scans, in a flickering manner, the surface of the photosensitive drum 1k according to a signal from an exposure control device 10. As a result, an electrostatic latent image is formed on the photosensitive drum 1k.

Herein, the scanning direction of the laser beam 7 represents the main-scanning direction, while the rotation direction A of the photosensitive drum 1k represents the sub-scanning direction.

The electrostatic latent image is developed into a toner image with the use of a black (K) toner that is charged by the reverse potential supplied from a developing roller 54. The developed toner image is then transferred onto an intermediate transfer belt 61. The configurations of developing units 60c, 60m, and 60y are also identical. The developing units 60c, 60m, and 60y form toner images in cyan (C), magenta (M), and yellow (Y) colors, respectively, and sequentially and superimposedly transfer the respective toner images onto the intermediate transfer belt 61.

The C, M, Y, and K toner images, superimposedly transferred onto the intermediate transfer belt 61, are then collectively transferred by a transfer roller 55 onto a continuous paper sheet 59, which is supplied from a paper feed stack 57. A fixing unit 56 fixes the toner images on the continuous paper sheet 59 by applying heat and pressure. The paper sheet, on which an image is formed by the abovementioned imaging operation, is then discharged to a catch tray 58.

Since the mechanism of concentration fluctuation occurrence does not depend on any particular developing unit, the following description is given with reference to the developing unit 60k.

In the abovementioned sequence of operations, the photosensitive drums 1k to 1y are usually positioned under strict supervision. Irrespective of that, due to the variability in the accuracy of component supervision, a small eccentricity occurs as illustrated in FIG. 10A (in FIG. 10, an expanded view is illustrated for the sake of convenience in explanation).

If eccentricity as mentioned above exists in the photosensitive drum 1k, then periodic fluctuation occurs in the developing gap (not illustrated) between the photosensitive drum 1k and a developing roller 54. That is one of the main factors causing periodic concentration fluctuation in output images.

Figure 10A:
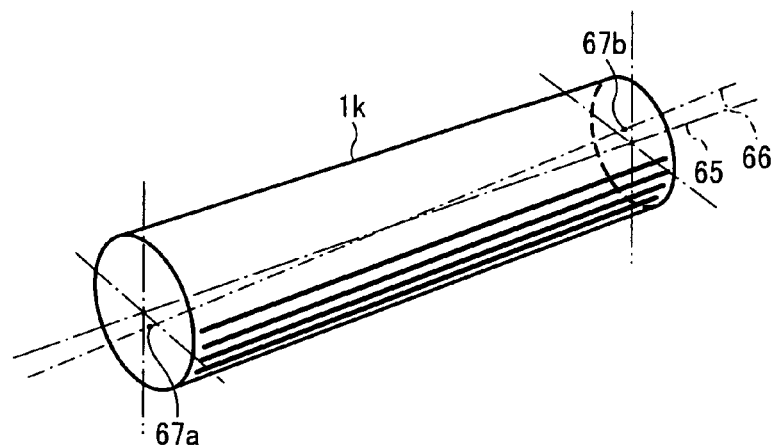
FIGS. 10A and 10B are explanatory diagrams for explaining eccentricity occurring in a photosensitive drum.

In the case illustrated in FIG. 10A, a rotation axis intersection point 67a at the left end of the photosensitive drum 1k and a rotation axis intersection point 67b at the right end of the photosensitive drum 1k lie on the opposite side of a central axis 65. Hence, on an image formed as the printed result, the concentration fluctuation occurs in opposite phases at both ends (in the main-scanning direction) of the image.

Figure 10B:
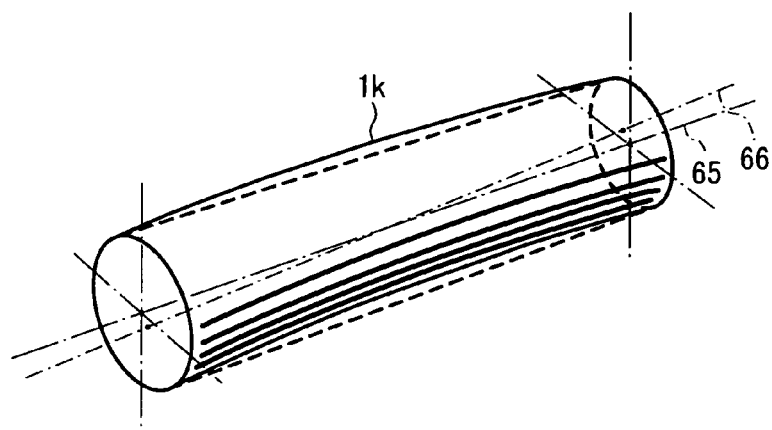

Often times, the photosensitive drum 1k decenters in only one direction with respect to the rotation axis (central axis) 65 and the concentration fluctuation occurs in the same phase at both ends of an image. Although not extreme as that, the concentration fluctuation at both ends of an image sometimes differs in phase. Moreover, as a still minute eccentricity mode, a bend mode can be cited as illustrated in FIG. 10B in which the photosensitive drum 1k has a slight bend with respect to the central axis 65. In that case, since the distribution of the developing gap at each rotation position in the main scanning direction (direction of the drum central axis 65) is no more linear, a high order of concentration unevenness occurs in the main scanning direction.

Figure 2:
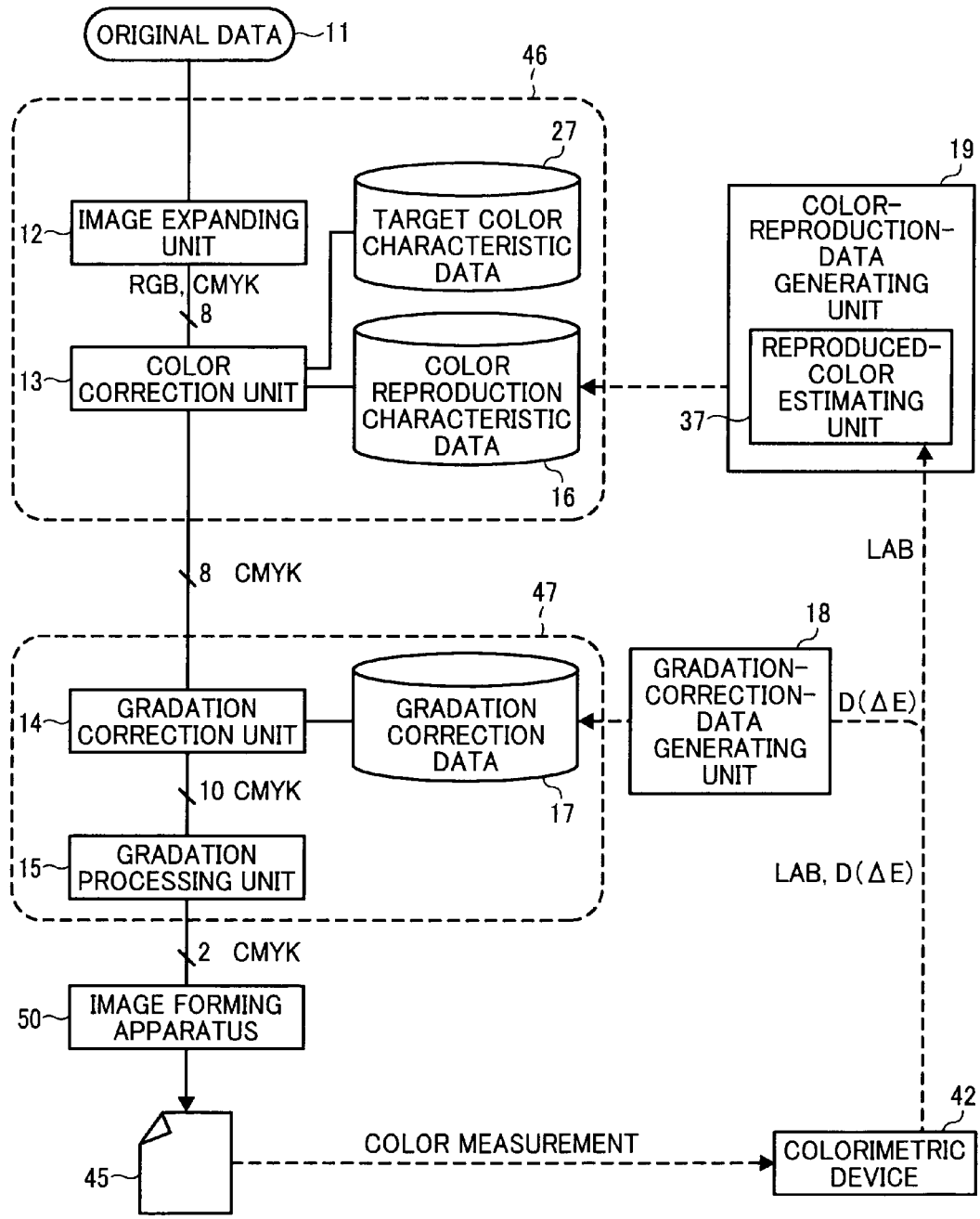
FIG. 2 illustrates a flow of an image processing operation performed by an administrator personal computer (PC)

FIG. 2 illustrates a flow of the image processing operation performed by the administrator PC 41. The image processing operation is mainly performed in a first image processing unit 46 and a second image processing unit 47. The first image processing unit 46 expands original data 11 of the user in a bitmap that is an arrangement of color gradation values (usually 8-bit integer values in the range of 0 to 255) equivalent to four colors of C, M, Y, and K. The second image processing unit 47 converts the bitmap of C, M, Y, and K colors into a gradation expression format that is expressible by the image forming apparatus 50.

In the first image processing unit 46, firstly, an image expanding unit 12 expands the original data 11 including contents such as fonts, line and bitmap into bitmap data that includes 8 bits of each of C, M, Y, and K colors or each of R, G, and B colors at a specific resolution (for example, 1200 dots per inch (dpi)).

With respect to the bitmap data, a color correction unit 13 converts the RGB data or the CMYK data input thereto into CMYK data for proper color reproduction, based on color reproduction characteristic data 16 that specifies the color reproduction characteristic of a device obtained by combining the latter-stage second image processing unit 47 and the image forming apparatus 50, and based on target color characteristic data 27 that specifies the color reproduction characteristic of the target color representing the output target of sRGB (IEC61966-2-1) or Japan Color series by ISO/TC 130.

If the target color characteristic data 27 or the color reproduction characteristic data 16 has the data format of the ICC profile format defined by the International Color Consortium, then the color correction unit 13 can be configured to be a color management module compatible to that standard.

In the second image processing unit 47, gradation data c, m, y, and k of the C, M, Y, and K colors, respectively, that have 8-bit pixels is corrected by a gradation correction unit 14 according to gradation correction data 17 set by separately-performed calibration in such a way that the concentration gradation characteristic of each of the C, M, Y, and K colors in an image, which is output from the image forming apparatus upon going through the processing from a latter-stage gradation processing unit 15 onward, becomes the same as a predetermined gradation characteristic (described later). Usually, for this correction, a look up table (LUT) having 256 entries for each color is used.

Subsequently, the gradation processing unit 15 performs conversion for the purpose of reproducing the gradation value of each of the C, M, Y, and K colors that has been corrected by the gradation correcting unit 14 in the form of the pixel density or the area ratio of each color on the formed image. For example, for 2-bit pixel gradation (four gradations including white background) at 1200 dpi resolution, the image forming apparatus forms a single halftone dot having 6×6 pixels and combines four halftone dots as a single group among which the halftone dots are made to grow in a cyclic manner. Thus, the gradations are expressed with the area ratio of the four halftone dots in entirety. In that case, to each of the 6×6×4=144 pixels, the concentration expression of three gradations except the white background is possible. Hence, the total number of resultant gradations is equal to 144×3+1=433.

Hence, as a preparation for a case when the total number of gradations, upon performing the gradation processing, exceeds 256, the output range of the gradation correction unit 14 is set to 10 bits.

Via the second image processing unit 47, the CMYK signals, converted into 2-bit pixel signals, are sent to the exposure control device 10 (see FIG. 1) corresponding to the C, M, Y, and K colors in the image forming apparatus 50 and are reproduced in the form of images on a paper sheet as the result of the abovementioned imaging operation.

Described below is the sequence of operations performed to configure the gradation correction data 17 and the color reproduction characteristic data 16 indicated by dashed arrows in FIG. 2.

Firstly, in the case of configuring the gradation correction data 17, the color correction unit 13 is bypassed and, as the gradation correcting unit 17, a table is used that maps the input range of 0 to 255 on the range of gradation processing (in the above example, range of 0 to 432) in a simple linear manner. For example, to match to the range of 0 to 432 of gradation processing given in the above example, a value obtained by rounding off 432/255×n to the closest whole number is assigned to the n-th element.

With respect to that setting, from a colorimetric chart including arrangement of gradation patches of the C, M, Y, and K colors and based on the concentration measurement values measured by the colorimetric device 42, a gradation-correction-data generating unit 18 generates the gradation correction data 17 in such a way that the gradation characteristic of the image forming apparatus 50, disposed subsequent to the second image processing unit 47, is equal to the predetermined gradation characteristic.

At that time, for example, by using the method disclosed in Japanese Patent Application Laid-open No. 2007-264364 for configuring the gradation correction data 17, the measurement values of the colorimetric chart that is used for obtaining the gradation characteristic can be averagely avoided of the effect of concentration fluctuation in the sub-scanning direction.

In the case of configuring the color reproduction characteristic data 16, firstly, after setting the gradation correction data 17 generated by the gradation-correction-data generating unit 18 as described above, the color correction unit 13 is bypassed and a reproduced-color estimating unit 37 according to the present embodiment is to be configured from the measurement values of the colorimetric device 42 that correspond to a colorimetric chart described later.

A color-reproduction-data generating unit 19 makes use of the reproduced-color estimating unit 37 and generates the color reproduction characteristic data 16 as the combined color reproduction characteristic of the latter-stage of second image processing unit 47 and the image forming apparatus 50.

Particularly, with the colorimetric chart and the reproduced-color estimating unit 37 according to the present embodiment, the reproduced-color estimating unit 37 is put into practice that is free of the effect of concentration fluctuation occurring due to the image forming apparatus 50 in the sub-scanning direction of the colorimetric chart. Consequently, the color reproduction characteristic data 16 generated by the color-reproduction-data generating unit 19 is also configured to be free of the effect of concentration fluctuation occurring due to the image forming apparatus 50 in the sub-scanning direction of the colorimetric chart.

Meanwhile, usually, the first image processing unit 46, the gradation-correction-data generating unit 18, and the color-reproduction-data generating unit 19 are implemented as procedures executed by software installed in the administrator PC 41. Moreover, the second image processing unit 47 is implemented as software installed in the administrator PC 41 or as hardware incorporated in the image forming apparatus 50.

FIG. 3A illustrates an example of a colorimetric chart 20 according to the present embodiment. The colorimetric chart 20 illustrated in FIG. 3A is used in obtaining basic data for configuring the reproduced-color estimating unit 37 and the gradation correction data 17 illustrated in FIG. 2.

With respect to the colorimetric chart 20 illustrated in FIG. 3A, the horizontal direction is the main-scanning direction and the vertical direction is the sub-scanning direction. The colorimetric chart 20 is output by the image forming apparatus 50 on a paper sheet of the A4 size or the letter size.

The colorimetric chart 20 includes control patch areas 21a, 21b, 22a, and 22b that are color-fluctuation-detecting patch columns arranged on both sides in the sub-scanning direction. Besides, the colorimetric chart 20 includes a colorimetric patch area 23 that is sandwiched between the control patch areas 21a, 21b, 22a, and 22b. Each patch is a square-shaped region of 8 mm×8 mm. Each of the control patch areas 21a, 21b, 22a, and 22b includes patches composed of 1 column and 31 rows, while the colorimetric patch area 23 includes patches composed of 19 columns and 31 rows (=589 patches) so that the total patch area is composed of 23 columns and 31 rows (238 mm×192 mm).

In the control patch areas 21a and 21b, patches having 100% (thick concentration) of each of the C, M, Y, and K colors are arranged in a repeating manner in the sub-scanning direction. In the control patch area 21a, the patches are arranged in the order of C, M, Y, and K; while in the control patch area 21b, the patches are arranged in the order of Y, K, C, and M. In the control patch areas 22a and 22b, 50% halftones (in 8-bit signal, 128/255 gradations) of each of the C, M, Y, and K colors are arranged in a repeating manner in the sub-scanning direction. In the control patch area 22a, the halftones are arranged in the order of C, M, Y, and K; while in the control patch area 22b, the halftones are arranged in the order of Y, K, C, and M.

In the colorimetric patch area 23 sandwiched between the control patch areas 21a, 21b, 22a, and 22b; single-color patches or mixed-color patches are arranged for the purpose of obtaining the teacher data of the reproduced-color estimating unit 37. For the purpose of configuring the teacher data of the reproduced-color estimating unit 37, patches are arranged according to the ANSI IT8.7/3 standard, the IT8.7/4 standard (ANSI stands for American national standards institute), or the ECI2002 chart.

For example, in the case of following the ANSI IT8.7/3 standard defining 928 mixed-colors, the mixed-color patches of these 928 colors are assigned (for example, randomly) to the colorimetric patch area 23 in the colorimetric chart 20 worth two pages. In the colorimetric patch area 23 in the colorimetric chart 20, it is possible to use 589×2=1178 patches. Thus, while assigning the 928 colors thereon, 250 patches (about eight columns) remain in excess. That remaining area can be considered as the blank space worth four columns in each page or can be used for arranging arbitrary patches functioning as estimation value detection patches described later. Alternatively, in a case there occurs the bend mode eccentricity in the photosensitive drum 1k as illustrated in FIG. 10B, additional control patch areas 21c and 22c as illustrated in FIG. 3A can also be arranged in that remaining area.

In a similar manner to the abovementioned description, in the control patch area 21c, patches, having 100% (thick concentration) of each of the C, M, Y, and K colors, are arranged in a repeating fashion in the sub-scanning direction and arranged in the order of K, C, M, and Y. In the control patch area 22c, 50% halftones of each of the C, M, Y, and K colors are arranged in a repeating fashion in the sub-scanning direction and arranged in the order of K, C, M, and Y.

Meanwhile, in a case of following the ANSI IT8.7/4 standard defining 1617 colors, the mixed-color patches of these 1617 colors are assigned to the colorimetric patch area 23 in the colorimetric chart 20 worth three pages. In that case, the remaining area is worth 589×3−1617=150 patches (less than five rows). Thus, the additional control patch areas 21c and 22c could be arranged in only the first two pages.

Described below is the concentration fluctuation estimating method using control patches with reference to the black (K) patches in the control patch area 22a.

A curved line 24 in FIG. 3A illustrates the relation between the colorimetric chart 20 when the photosensitive drum 1k has the diameter of φ100 mm and the concentration fluctuation that is in synchronization with the rotation period of the photosensitive drum 1k. The horizontal axis represents the concentration deviation from the average and the left direction along the horizontal axis corresponds to the high concentration direction. The vertical axis corresponds to sub-scanning direction positions x of the colorimetric chart 20 that also includes the non-printed region with reference to the leading end of the first page of the colorimetric chart 20.

The photosensitive drum 1k rotates asynchronously with respect to the writing positions in the colorimetric chart 20. The open dots on the curved line 24 represent the concentration fluctuation values corresponding to the black (K) patch positions in the control patch area 22a; and measured concentrations Di represent the concentration fluctuation values having noise that is attributed to some other factors. From the calculated values (xi, Di), fitting is performed using the non-linear least-square method with the following Equation (1) as the model and the fluctuation curved line 24 of the concentration values D is estimated with amplitude (A), phase (P), and offset (O) as the parameters.

$$D(x)=A\sin(2x/d+P)+O \qquad (1)$$

where, d=100 mm is considered to be the known fixed value of the drum diameter of the photosensitive drum 1k.

Regarding the curved line 24 illustrated in FIG. 3A, since the samples of the control patches are skewed with respect to the area of an estimated concentration fluctuation cycle TL, there is a possibility of a decline in the estimation accuracy of the concentration fluctuation amplitude. Herein, since there are a sufficient number of samples with respect to the number of parameters in model Equation (1), it is possible to approach the fluctuation to an extent. However, depending on the diameter d of the photosensitive drum, there are times when sufficient number of independent samples cannot be obtained within the fluctuation cycle according to the relation with the patch cycle.

A curved line 25 in FIG. 3A is an example of the concentration fluctuation when the photosensitive drum has the diameter d of 30 mm. On the control patch area 22a, the concentration fluctuation occurs for about three cycles. The measuring points corresponding to those cycles T on the curved line 25 are represented by open dots, open triangles, and open squares, respectively.

In that case, the drum fluctuation cycle T and the K patch arrangement worth three cycles in the control patch area 22a are in close relation. Thus, if the measuring points represented by the open dots, the open triangles, and the open squares are superimposed on the same cycle; then, as illustrated in FIG. 3B, the number of actual independent measuring points is only three that is the bare minimum number for obtaining model Equation (1). In that condition, it is clear that the estimated values run a high risk of not getting fixed due to the effect of noise other than the drum cycle fluctuation.

The detailed explanation regarding that condition is as follows. In the example of the photosensitive drum whose diameter d=30 as illustrated in FIG. 3, a patch size dp of each control patch is set to 8 mm and a basic cycle Tn of the control patch arrangement is set to four patch cycles (Tn=4) equivalent to the number of basic colors of C, M, Y, and K. Thus, the recurrence cycle in the sub-scanning direction of the same patch (x direction in FIG. 3) is obtained as:

Tn·dp=32 mm.

That is, for the photosensitive drum cycle T=π≈94 mm and for the patch cycle of the control patches Tn·dp=32 mm, a ratio Rt=πd/(Tn·dp) comes out to 2.93, which is close to the integral ratio 3. Hence, as plotted on the curved line 25 in FIG. 3B, no more than three sample points can be essentially obtained in the concentration fluctuation cycle (T) attributed to the photosensitive drum diameter d.

Besides, since 3Tn·dp=96 mm, the error in the photosensitive drum cycle T is 2 mm (about 2% of the photosensitive drum cycle T). Thus, even with respect to the estimated concentration fluctuation cycle (photosensitive drum cycle), the difference is only to such an extent that it is not possible to consider sufficient independence for the measurement gauge (usually about φ4) of a concentration-fluctuation colorimetric device. That is the reason for not being able to obtain more than three independent measuring points as illustrated in FIG. 3B, which is the bare minimum number for obtaining model Equation (1).

Particularly, in the case when the ratio Rt between the photosensitive drum cycle T and the patch cycle Tn·dp is an integral ratio approximately smaller than 3, the solution of Equation (1) cannot be obtained. In this way, to avoid a situation in which the sample points lose their independence due to the consistency in the cyclic nature, it is necessary to either make sure that the ratio Rt=πd/(Tn·dp) between the photosensitive drum cycle T and the patch cycle Tn·dp is not approximately an integral ratio or to make sure that even if the ratio Rt=πd/(Tn·dp) is an integral ratio, it is a sufficiently large integral ratio (for example, ratio more than 5).

However, on the other hand, for the portrait feed of an A4-size paper sheet or a letter size paper sheet and for the patch cycle of about 30 mm for the control patches Tn·dp, the number of sample points arrangable on the same column in the sub-scanning direction of the original paper sheet is limited to about seven at a maximum as illustrated in the example in FIG. 3A.

Hence, when the ratio Rt between the photosensitive drum cycle T and the patch cycle Tn·dp is less than 5, for example, nearly equal to 3; then the phase of half of the patches can also be shifted (phase shift) in the sub-scanning direction so that the independent sample points on the same photosensitive drum cycle T can be doubled to six points. That enables achieving almost the same effect as the case of securing seven independent sample points by preventing the ratio Rt from becoming an integral ratio.

The loss in the sample points due to the consistency in the cyclic nature as described above also occurs in the case of dp=6 mm. However, regarding the phase shifting method, it is not necessary to ensure that the ratio Rt between the photosensitive drum cycle T and the patch cycle Tn·dp is not an integral ratio with respect to the few specification differences in the devices such as having a different value of the photosensitive drum diameter d, having a different value of the patch size dp of the control patches, or having gaps in between the patches or with respect to the layout differences in the control patches. Hence, the phase shifting method is effective with a wide scope of application.

Particularly, the phase shifting method is effective for a printer in which the drum diameter d of the photosensitive drum for black (K) color is different than the drum diameter d of the photosensitive drums for C, M, and Y colors. Thus, the phase shifting method is effective for a printer in which a plurality of photosensitive drum diameters is present. The explanation regarding such a phase shifting method is given below.

Figure 4B:
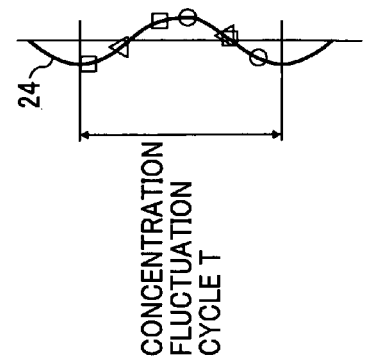
FIGS. 4A and 4B illustrate a second example of the colorimetric chart according to the present embodiment.
Figure 4A:
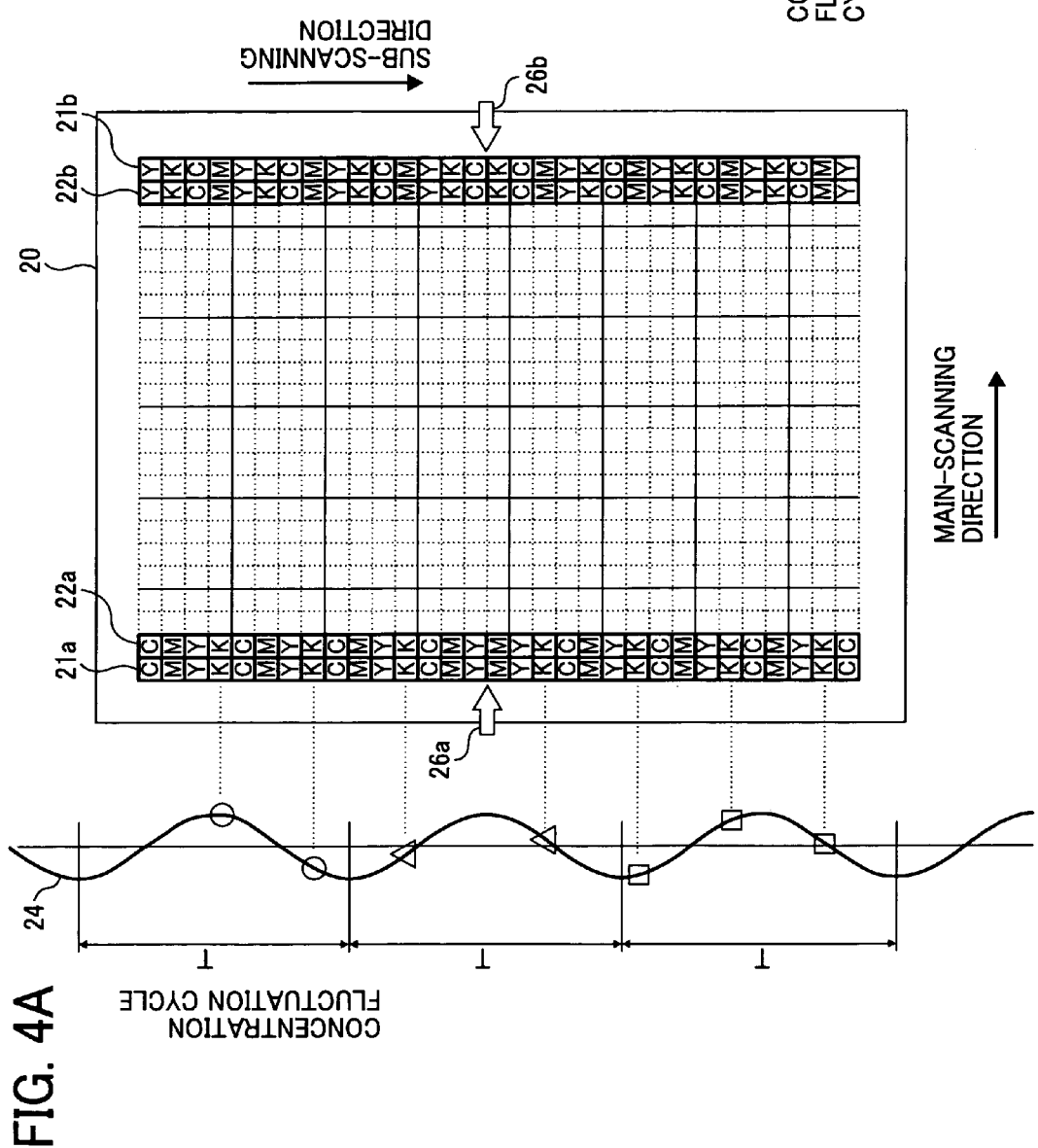

FIG. 4A illustrates an example in which the control patches are arranged with shifting the phase thereof midway through a page. The control patch areas 21a and 21b illustrated in FIG. 4A are arranged by shifting the patch arrangement cycle for two patches at positions indicated by arrows 26a and 26b, respectively.

More particularly, as the patch columns, the control patch areas 21a, 22a, 21b, and 22b are arranged at both ends of the colorimetric chart 20. Then, up to the predetermined arrow position 26a, the control patches in the control patch areas 21a and 22a are arranged in a repeated fashion in the sub-scanning direction and arranged in the order of C, M, Y, and K (first order) thus forming a first patch group; and from the predetermined arrow position 26a onward, the control patches in the control patch areas 21a and 22a are arranged in a repeated fashion in the sub-scanning direction and arranged in the order of Y, K, C, and M (second order), which is different than the first order, thus forming a second patch group.

Similarly, up to the arrow position 26b that is at the same horizontal level as the predetermined arrow position 26a, the control patches in the control patch areas 21b and 22b are arranged in a repeated fashion in the sub-scanning direction and arranged in the order of Y, K, C, and M (first order) thus forming a first patch group; and from the predetermined arrow position 26b onward, the control patches in the control patch areas 21b and 22b are arranged in a repeated fashion in the sub-scanning direction and arranged in the order of C, M, Y, and K (second order), which is different than the first order, thus forming a second patch group. In this way, the control patch areas 21a and 22a have a different first order and a different second order than the two orders in the control patch areas 21b and 22b.

Thus, with respect to the arrow positions 26a and 26b, the patch arrangement is such that the lower halves of the control patch areas 21a and 21b illustrated in FIG. 3A are interchanged. Identically, the control patch areas 22a and 22b are also arranged by shifting the patch arrangement cycle for two patches at the positions indicated by the arrows 26a and 26b, respectively.

In an identical manner to the colorimetric chart 20 illustrated in FIG. 3, the colorimetric chart 20 in FIG. 4 can also include a control patch area near the center in which a plurality of control patches can be arranged with a different order than the first order or the second order of each of the control patch areas 21a, 22a, 21b, and 22b arranged on both sides.

FIG. 4B illustrates, in an identical manner to FIG. 3B, the sample positions of black (K) patches in the control patch area 22a illustrated in FIG. 4A that are superimposedly displayed on the same concentration fluctuation cycle. Herein, the sample positions in the concentration fluctuation cycle T are reasonably scattered thereby making it possible to estimate the model parameters in Equation (1) in a more stable manner.

Figure 5A:
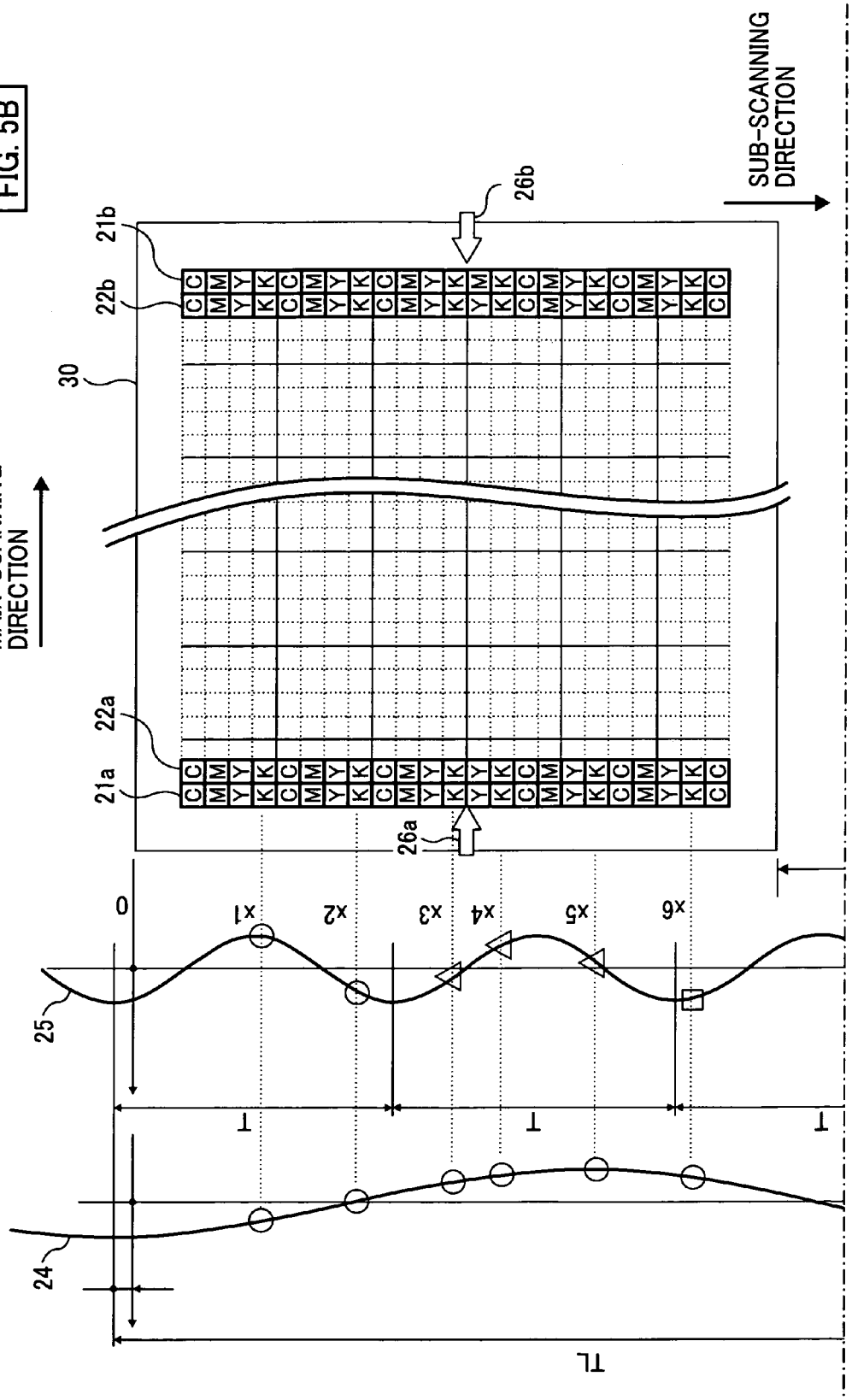
FIG. 5 illustrates a third example of the colorimetric chart according to the present embodiment.
Figure 5B:
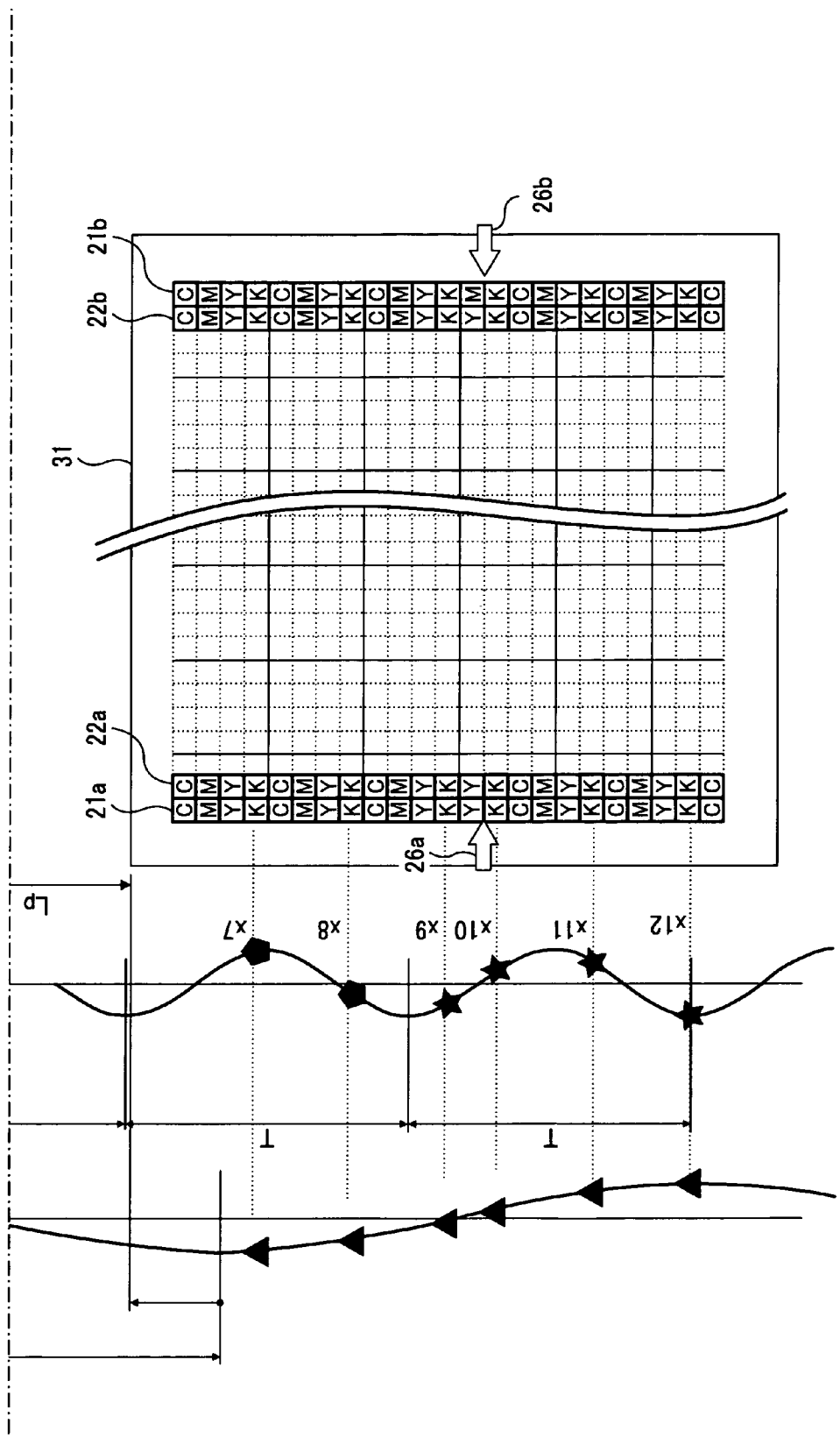

FIG. 5 illustrates, for a case of continuous printing and with reference to an example when the colorimetric chart is output in the landscape manner, the method of enhancing the estimation accuracy of the concentration fluctuation by making use of inter-page information. In FIG. 5, it is assumed that colorimetric charts 30 and 31 are subjected to letter landscape output during continuous printing.

The colorimetric chart 30 represents the first page and the colorimetric chart 31 represents the second page. An inter-page space Lp is 60 mm when converted to the on-paper distance. In an identical manner to the colorimetric chart 20, each of the colorimetric charts 30 and 31 includes the control patch areas 21a, 21b, 22a, and 22b, and the patch cycle is shifted by two patches at the arrow positions 26a and 26b illustrated in the central part of the pages along the sub-scanning direction.

In an identical manner to FIG. 3A, the curved lines 24 and 25 illustrated in FIG. 5 represent the relation between the concentration fluctuation and the page positions. The curved line 24 corresponds to the concentration fluctuation when the photosensitive drum 1k has the diameter of φ100 mm, while the curved line 25 corresponds to the concentration fluctuation when the photosensitive drum 1k has the diameter of φ30 mm.

At that time, if the paper width (sub-scanning direction) referred to by LW is 216 mm; then, for the photosensitive drum diameter d=100 mm (curved line 24), a phase difference (ΔT) of the concentration fluctuation between the pages is equal to ΔT=TL−(Lw+Lp)=38 mm that happens to be equivalent to about 12% of the concentration fluctuation period TL. Identically, for the photosensitive drum diameter d=30 mm (curved line 25), ΔT=3T−(Lw+Lp)=6.6 mm that happens to be equivalent to about 7% of the concentration fluctuation period T.

For the photosensitive drum diameter d=100 mm (curved line 24), the sample points (open dots) on the curved line 24 in FIG. 5, which correspond to the black (K) patches in the control patch area 22a of the colorimetric chart 30 on the first page, do not cover the entire amplitude range of the fluctuation. Hence, it is expected that the estimation accuracy of the fluctuation amplitude declines due to the effect of other disturbances. With regard to that problem, improvement can be made by making use of the phase difference occurring during continuous printing.

That is, since only a part of the photosensitive drum cycle T can be sampled in the first page; the phase difference occurring during continuous printing is put to use for increasing the sample points in the drum cycle. In that case, as described above, the phase difference in the sample points occurring due to the inter-page space is in the order of about 10% of the concentration fluctuation cycle (photosensitive drum cycle). Hence, simply, as long as the positions of the control patches across the pages are retained in a mutually corresponding manner, it is almost certainly possible to enhance the measurement efficiency.

In FIG. 5, with the leading end of the paper sheet of the colorimetric chart 30 on the first page considered as the reference point in the sub-scanning direction x, the patch positions of the colorimetric chart 31 on the second page are converted as x7 to x12. In this way, the information on the control patch area 22a of the colorimetric charts output during continuous printing is continually added and used in the estimation of Equation (1). Hence, in the case of printing a plurality of pages, the estimation accuracy of the concentration fluctuation in the sub-scanning direction is enhanced. The abovementioned description is applicable to the control patch area 21a used in the estimation of thick concentration fluctuation and also to the control patch areas 21b and 22b that are illustrated on the right side and used in concentration fluctuation estimation.

FIG. 6A illustrates the sample points on the curved line 24 in FIG. 5 that are plotted superimposedly on the same cycle. In FIG. 6A, the open dots represent the sample points of the black (K) patches on the colorimetric chart 30 on the first page; while the dark triangles represent the sample points of the black (K) patches on the colorimetric chart 31 on the second page. By using the sample points of two pages, the samples obtained by combining the open dots and the dark triangles approximately cover the samples over the entire amplitude range of the concentration fluctuation (curved line 24).

Similarly, with respect to the curved line 25 illustrated in FIG. 5 and corresponding to the photosensitive drum diameter of 30 mm, FIG. 6B illustrates the sample points of the black (K) patches in the colorimetric charts 30 and 31 that are plotted superimposedly on the same cycle. In that case, the sample points are reasonably scattered in the concentration fluctuation cycle T and it is confirmed that more ideal sampling data can be obtained.

In order to perform concentration fluctuation estimation in a more stable manner, it is ideal to obtain an estimate using three or more colorimetric charts. However, increasing the number of pages of the colorimetric charts beyond necessity leads to the complications in management or to the increase in the man-hours required for colorimetric chart evaluation. Thus, it is desirable to keep the number of colorimetric charts to the requisite minimum. In the case of following ANSI IT8.7/4 standard, it is appropriate to use about three pages of colorimetric charts when the paper is of the A4-size or the letter size. Similarly, when the A3-size paper is also used in combination or when somewhat large patch sizes are to be taken into consideration, it is appropriate to use about four pages of colorimetric charts.

In this way, by arranging the color-fluctuation-detecting patch columns at a plurality of places in the main-scanning direction of a colorimetric chart, it becomes possible to detect the color cycle fluctuation having phase differences or amplitude differences in the main-scanning direction. Besides, by configuring the color-fluctuation-detecting patch columns to have mutually different positions of the basic colors, it becomes possible to enhance the fluctuation detection accuracy regarding the color cycle fluctuation having no phase differences in the main-scanning direction. Moreover, by detecting the color fluctuation in a corresponding manner with the colorimetric charts worth a plurality of pages, detection of fluctuation over a longer term becomes possible and the fluctuation detection accuracy for short-term fluctuation can also be enhanced.

Figure 7A:
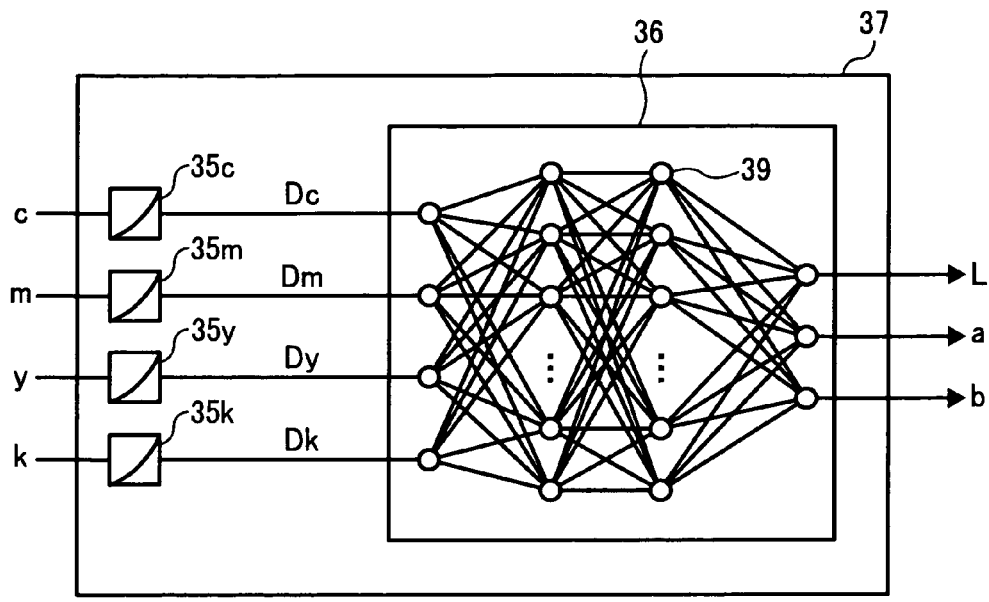
FIGS. 7A and 7B are schematic diagrams of an exemplary configuration of a reproduced-color estimating unit according to the present embodiment.

FIG. 7A illustrates the reproduced-color estimating unit 37 that estimates the CIEL*a*b* values (hereinafter, simply referred to as Lab values) from the gradation values of the C, M, Y, and K colors by making use of the measurement values of the colorimetric charts described above.

Herein, with respect to the input gradation values c, m, y, and k of the C, M, Y, and K colors, respectively, in the second image processing unit 47; the reproduced-color estimating unit 37 estimates the Lab values of an output image 45 output by the image forming apparatus 50. The reproduced-color estimating unit 37 includes concentration conversion functions 35c, 35m, 35y, and 35k for converting the input gradation values into concentration values as intermediate parameters and includes a neural net 36 that represents nonlinear multidimensional conversion for associating the concentration value of each color to the corresponding LAB value. For each node in the neural net 36, a weight coefficient 39 is held as the internal parameter.

Figure 7B:
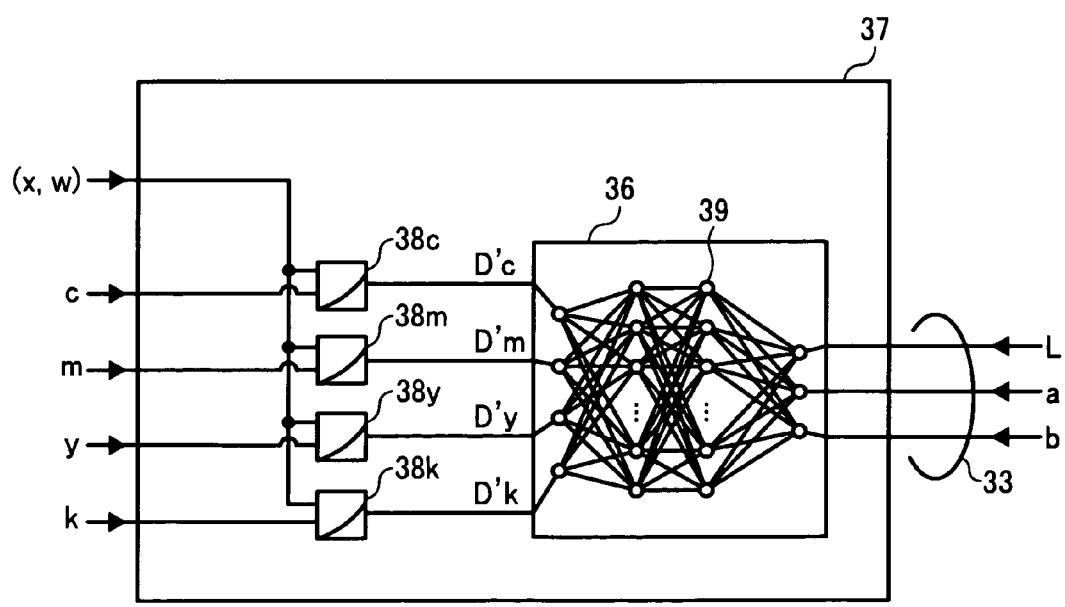

FIG. 7B is an operation conceptual diagram for educating the optimization of the weight coefficients 39 that function as the internal parameters in the neural net 36. At the time of educating the neural net 36, the concentration conversion functions 35c, 35m, 35y, and 35k can be substituted by fluctuation-correction-supporting concentration conversion functions 38c, 38m, 38y, and 38k corresponding to a main-scanning direction position w and the sub-scanning direction position x of the colorimetric patches, and the output of those functions can be used for the concentration conversion at the input side of the neural net 36.

With respect to the neural net 36, corrected $D_c'$, $D_m'$, $D_y'$, and $D_k'$ are input and the colorimetric values measured as the Lab values corresponding to the original input signals c, m, y, and k by the colorimetric device 42 from the output image 45 are considered to be teacher signals 33, and the weight coefficients 39 are optimized using back propagation (error inverting propagation method).

In this way, one of the main features of the present embodiment is that the correction related to the concentration fluctuation is performed with respect to the input signal side at the time of educating the neural net 36. Hence, the neural net 36 itself gets configured in a separated manner from the concentration fluctuation.

Figure 8:
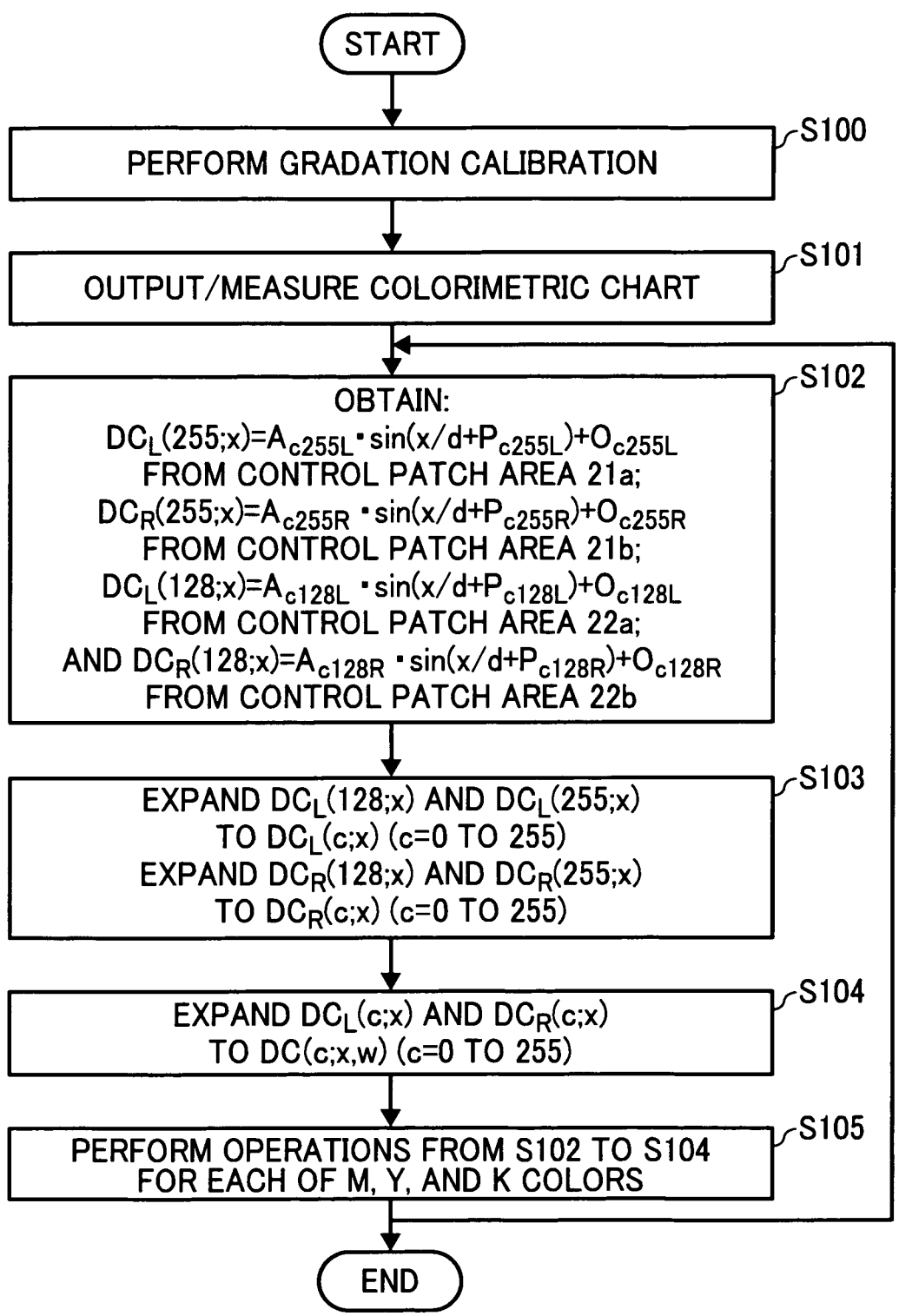
FIG. 8 illustrates a configuration sequence for fluctuation-correction-supporting concentration conversion functions according to the present embodiment.
Figure 9A:
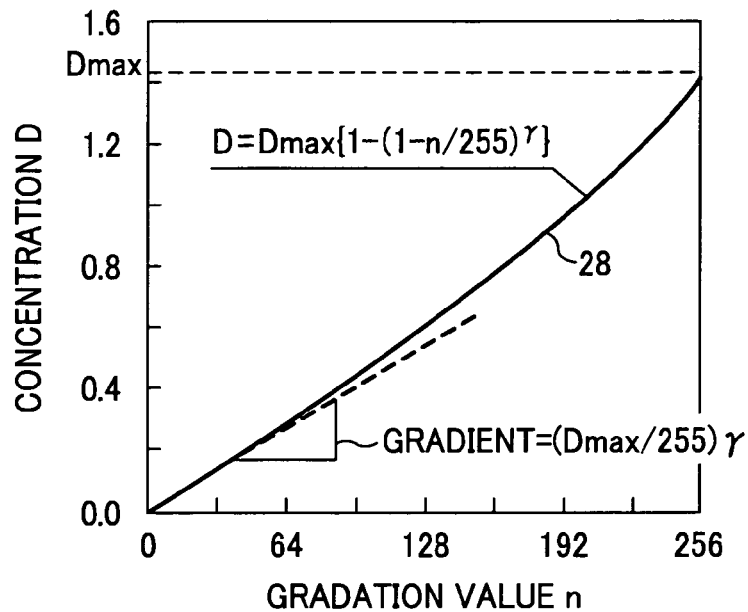
FIGS. 9A and 9B illustrate target gradation characteristic and concentration fluctuation functions in the sub-scanning direction according to the present embodiment.

FIG. 8 illustrates a configuration sequence for the fluctuation-corrected concentration conversion functions. Firstly, during the gradation calibration performed at Step S100, the gradation correction data generation, described above, is performed in advance and the gradation correction data 17 illustrated in FIG. 2 is set. In the present embodiment, the target gradation characteristic is given by a two-parameter function including $D_{max}$ and γ as parameters as represented by a curved line 28 in FIG. 9A. Herein, $D_{max}$ and γ are defined in $$D(n)=D_{max}\{(1-n/255)^{\gamma}\} \qquad (2)$$

where, n represents an 8-bit input gradation value, D(n) represents the target concentration characteristic, $D_{max}$ represents the maximum thick concentration, and y represents a parameter for determining the gradient of the concentration D(n) with respect to "n" on the highlighted side.

As a result, the average gradation characteristic of each of the C, M, Y, and K colors obtained by combining the second image processing unit 47 illustrated in FIG. 2 and the image forming apparatus 50 is corrected as a characteristic of the type of Equation (2) having a predetermined γ value.

Then, at Step S101, the colorimetric chart 20 (or the colorimetric chart 30 or the colorimetric chart 31) is output in which the mixed-color patches corresponding to the ANSI IT8.7/3 standard are arranged in the colorimetric patch area 23, and the colorimetric device 42 measures the Lab values of the control patch areas 21*a*, 21*b*, 22*a*, and 22*b* and measures the Lab value of the colorimetric patch area 23.

Figure 9B:
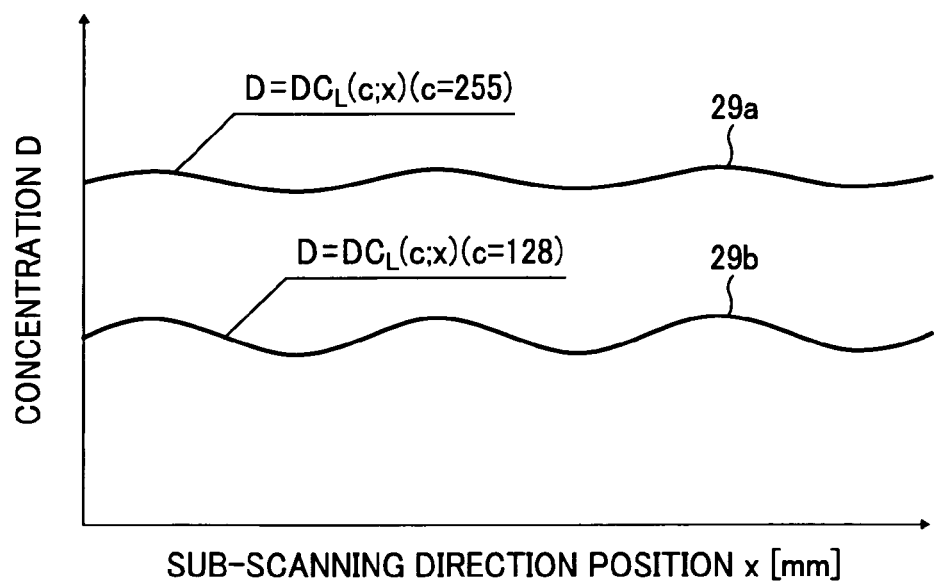

At Step S102, firstly, from the control patch area 21*a*, model parameters $A_{c255L}$, $P_{c255L}$, and $O_{c255L}$ of thick fluctuation are obtained for the cyan (C) color from Equation (1), and a concentration fluctuation function $DC_L(255; x)$ in the sub-scanning direction is obtained as represented by a curved line 29*a* in FIG. 9B.

$$DC_L(255;x)=A_{c255L}\cdot\sin(x/d+P_{c255L})+O_{c255L}$$

Identically, from the control patch area 22*a*, a 50% concentration fluctuation function $DC_L(128; x)$ is obtained as represented by a curved line 29*b* in FIG. 9B.

$$DC_L(128;x)=A_{c128L}\cdot\sin(x/d+P_{c128L})+O_{c128L}$$

In the same way, from the control patch areas 21*b* and 22*b* on the right side, $DC_R(255; x)$ and $DC_R(128; x)$, respectively, are obtained.

Subsequently, at Step S103, the $DC_L(c; x)$ and the $DC_R(c; x)$ (where c=128,255) are expanded with respect to an arbitrary integer value with the range of c=0 to 255. Herein, by making use of the fact that the concentration characteristic is calibrated in advance to the characteristic calculated by Equation (2) of the two-parameter model, the gradation characteristic that has been affected by the concentration fluctuation is also approximated by the model of Equation (2). Thus, $$DC_L(c;x)=DC_L(255;x)\{1-(1-c/255)^{\gamma_{cL}}\} \qquad (3)$$

Meanwhile, the expanded $DC_L(c; x)$ can be obtained by $$\gamma_{cL}=-\log 2\{1-DC_L(128;x)/DC_L(255;x)\} \qquad (4)$$

The $DC_R(c; x)$ is also obtained in an identical manner.

If, in the abovementioned expansion, particularly the concentration linearity is high; then it is alternatively possible to perform expansion by making use of piecewise linear interpolation in which the simpler three points of (0, $DC_L(0; x)$), (128, $DC_L(128; x)$), and (255, $DC_L(255; x)$) are linearly connected by line segments.

At Step S104, further expansion is performed by interpolating with respect to the main-scanning direction position w by using $$DC(c;x,w)=(w_R-w)/(w_R-w_L)DC_L(c;x)+(w_L-w)/(w_R-w_L)DC_R(c;x)$$

where, $w_L$ represents the main-scanning direction position on the control patches on the left side and $w_R$ represents the main-scanning direction position on the control patches on the right side. As a result, regarding the cyan (C) color, the concentration conversion function DC(c; x,w) gets formulated on the colorimetric chart 20 (or the colorimetric chart 30 or the colorimetric chart 31).

At Step S105, the operations from Step S102 to Step S104 are performed for each of the M, Y, and K colors. That results in the formulation of the DC(c; x,w) that is the fluctuation-correction-supporting concentration conversion function 38*c* of the cyan (C) color, the formulation of the DM(m; x,w) that is the fluctuation-correction-supporting concentration conversion function 38*m* of the magenta (M) color, the formulation of the DY(y; x,w) that is the fluctuation-correction-supporting concentration conversion function 38*y* of the yellow (Y) color, and the formulation of the DK(k; x,w) that is the fluctuation-correction-supporting concentration conversion function 38*k* of the black (K) color.

Meanwhile, in a case of adding the central control patch areas 21*c* and 22 in the colorimetric chart, three-point quadratic interpolation in the main-scanning direction is performed in place of the abovementioned linear interpolation.

In the present embodiment, the explanation is given with reference to the concentration measurement values as the measurement values of the control patch areas. However, the present embodiment is not limited to that case and, alternatively, the same correction can be performed by making use of the CIE color difference ΔE with reference to the paper sheet. In the case of using the CIE color difference ΔE, it becomes easier to perform the adjustment that is superior in equivalency in the Lab space.

In this way, according to the present embodiment, color fluctuation is properly eliminated from the measurement values, and the error in the fluctuation related to the estimation range of the reproduced colors can be reduced by half from the total amplitude to the half amplitude without having to add any additional control mechanism. Moreover, the intermediate parameters obtained by conversion from the patch input values of the colorimetric patches can be considered, without change, to be the concentration values of all colors. Thus, with the parameters that are easy to measure, it becomes possible to separate, from a color fluctuation estimating unit, the portion of estimating the reproduced colors with intermediate parameters that are not dependent on the concentration fluctuation unlike the input gradation values and are not affected by the printed result.

That is, if the input to a module for estimating the reproduced colors (with reference to FIGS. 7A and 7B, the neural net 36) directly corresponds to the input gradation values, then the relation between the input gradation values and the corresponding output concentration changes over time because of its dependency on the gradation reproduction characteristic of the printer. Hence, in the case when the gradation characteristic changes over time or when the individual specificity in the engine leads to a large difference in the gradation characteristic; then, in a worst-case scenario, it becomes necessary to reconfigure the module for estimating the reproducing colors.

Particularly, with respect to the changes caused at the development stage of the printer when the engine characteristic is unstable or when the specification for the target gradation characteristic is not sufficiently determined, the abovementioned issue causes re-implementation of the development task all over again thereby leading to a decline in the development efficiency.

In order to avoid such a problem, in the present embodiment, the input values to the neural net 36, which functions as the module for estimating the reproduced colors, are separated from the changes in the gradation characteristic in the form of concentration that has no relation with the concentration fluctuation and that is an easy-to-measure physical quantity.

Thus, the neural net 36, which functions as the module for estimating the reproduced colors, is configured independent of the individual specificity or the temporal changes in the gradation characteristic of the apparatus. Hence, as an advantage during the apparatus development, the neural net 36 can be developed independent of the task of designing the gradation characteristic. Particularly, since the individual specificity in the engine or the temporal changes in the gradation characteristic do not affect the module for estimating the reproduced colors, it becomes possible to enhance the versatility/independence of that module.

Moreover, in the present embodiment, when the intermediate parameter is set to the color difference ΔE with reference to the paper sheet, it becomes easier to manage in such a way that the distribution of the intermediate parameters is uniform in the color space. That makes it possible to enhance the uniformity in the estimation accuracy of the reproduced colors. Besides, in the reproduced-color estimating method, by estimating the phase/amplitude/offset of the color fluctuation by linking the colorimetric charts output over a plurality of pages, it becomes possible to enhance the estimation accuracy.

Meanwhile, the object of the present invention can also be achieved by providing, to a system or an apparatus, a recording medium, which stores therein the program code of software that implements abovementioned functions according to the present embodiment, and by executing the program code, which is stored in the recording medium, in a computer (or a central processing unit (CPU) or a micro processing unit (MPU)) of the system or the apparatus. In that case, the program code that is read from the recording medium implements the abovementioned functions according to the present embodiment so that the recording medium, storing therein the program code or the computer program, constitutes the present invention. As a recording medium for providing the program code, it is possible to use a hard disk, an optical disk, a magneto-optical disk, a nonvolatile memory card, or a read only memory (ROM). The computer reads and executes the program code so as to perform the abovementioned functions according to the present embodiment. That includes the case when the operating system (OS) running on the computer performs, in part or in whole, the abovementioned functions. The program code loaded from the recording medium can be written into a memory disposed in a function expansion board that is installed inside the computer or in a function expansion unit that is connected to the computer. In that case, a CPU in the function expansion board or the function expansion unit executes the instructions given in the program code and performs, in part or, in whole, the abovementioned functions. Meanwhile, a computer program that is executed to implement the functions according to the present embodiment can be downloaded from a server by means of network communication.

In this way, according to an aspect of the present invention, it becomes possible to reduce estimation errors regarding calibration or a color reproduction characteristic model.

Note 11. A color reproduction estimating method implemented in a color reproduction estimating device for estimating a color reproduction characteristic of an image forming apparatus that forms a color image on a printing medium by superimposing a plurality of basic colors based on image data, the color reproduction estimating method comprising:

measuring a patch color characteristic of a colorimetric chart
that is output by the image forming apparatus,
that includes a patch column arranged in a sub-scanning direction representing a conveying direction in which the image forming apparatus conveys the colorimetric chart, used in detecting periodic color fluctuation attributed to the image forming apparatus, and
that includes a colorimetric patch area; and estimating that includes
converting, based on an internal parameter configured based on a measurement value obtained by measuring the patch color characteristic, the measurement value of the colorimetric patch area measured at the measuring into an intermediate parameter that does not undergo a scale change due to concentration fluctuation and
estimating, based on the intermediate parameter and the internal parameter, reproduced colors of the image forming apparatus, wherein
from a color attribute value included in the patch color characteristic measured at the measuring, the estimating includes
estimating phase, amplitude, and offset of a color attribute fluctuation component of a basic color synchronizing with a particular cycle, and
correcting the intermediate parameter obtained by conversion from a patch input value of the colorimetric patch area.

Note 12. A computer program product that stores therein a computer program that causes a computer to implement a color reproduction estimating method, the computer estimating a color reproduction characteristic of an image forming apparatus that forms a color image on a printing medium by superimposing a plurality of basic colors based on image data, the computer program causing the computer to execute:

measuring a patch color characteristic of a colorimetric chart
that is output by the image forming apparatus,
that includes a patch column arranged in a sub-scanning direction representing a conveying direction in which the image forming apparatus conveys the colorimetric chart, used in detecting periodic color fluctuation attributed to the image forming apparatus, and
that includes a colorimetric patch area; and estimating that includes converting, based on an internal parameter configured based on a measurement value obtained by measuring the patch color characteristic, the measurement value of the colorimetric patch area measured at the measuring into an intermediate parameter that does not undergo a scale change due to concentration fluctuation and estimating, based on the intermediate parameter and the internal parameter, reproduced colors of the image forming apparatus, wherein from a color attribute value included in the patch color characteristic measured at the measuring, the estimating includes estimating phase, amplitude, and offset of a color attribute fluctuation component of a basic color synchronizing with a particular cycle, and correcting the intermediate parameter obtained by conversion from a patch input value of the colorimetric patch area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for measuring a color reproduction characteristic of an image forming apparatus, comprising:

a colorimetric device for measuring color reproduction characteristics data, the colorimetric device generates a colorimetric chart including a patch column that is arranged in a sub-scanning direction representing a conveying direction in which the image forming apparatus conveys the colorimetric chart and that is used in detecting periodic color fluctuation attributed to the image forming apparatus, wherein the patch column includes patches that are arranged in different phases on the same patch column, wherein the image forming apparatus that includes a photosensitive drum, and wherein the patch column includes a plurality of patches of different colors, and the plurality of patches are either arranged:

in a repeating fashion according to a non-integral cycle of a ratio Rt between a drum cycle of the photosensitive drum and the patch cycle of the plurality of patches of different colors or, when the ratio Rt is approximated to an integer equal to or smaller than five, arranged in a repeating fashion according to a cycle of the ratio Rt and in different phases.

2. The apparatus according to claim 1, wherein the patch column includes:

a first patch group in which a plurality of patches of different colors are arranged in a first order in a repeating fashion in the sub-scanning direction up to a predetermined position in the sub-scanning direction; and a second patch group in which a plurality of patches are arranged in a second order that is different than the first order in a repeating fashion in the sub-scanning direction from the predetermined position in the sub-scanning direction.

3. The apparatus according to claim 2, wherein the patch column is arranged in plurality in a main-scanning direction that is perpendicular to the sub-scanning direction, and in each patch column, the first patch group and the second patch group have a mutually different order.

4. The apparatus according to claim 3, wherein the patch column is arranged at both edges of the colorimetric chart.

5. The apparatus according to claim 4, wherein the patch column is arranged near a center of the colorimetric chart.

6. The apparatus according to claim 1, wherein the colorimetric chart is formed over a plurality of pages conveyed by the image forming apparatus at a predetermined page interval.

7. The apparatus according to claim 1, wherein the colorimetric chart is used in obtaining data for configuring a reproduced-color estimating unit and a gradation correction data.

8. The apparatus according to claim 1, wherein the colorimetric chart includes a patch area that is sandwiched between control patch areas.

9. The apparatus according to claim 8, wherein in the colorimetric patch area sandwiched between the control patch areas, single-color patches or mixed-color patches are arranged to obtain data of a reproduced-color estimating unit.

10. An apparatus for measuring a color reproduction characteristic of an image forming apparatus, comprising:

a colorimetric device for measuring color reproduction characteristics data, the colorimetric device generates a colorimetric chart including a patch column that is arranged in a sub-scanning direction representing a conveying direction in which the image forming apparatus conveys the colorimetric chart and that is used in detecting periodic color fluctuation attributed to the image forming apparatus, wherein the patch column includes patches that are arranged in different phases on the same patch column, a color reproduction estimating device for estimating the color reproduction characteristic of the image forming apparatus that forms a color image on a printing medium by superimposing a plurality of basic colors based on image data, and an estimating unit:

for converting, based on an internal parameter configured based on a measurement value obtained by measuring the patch color characteristic, the measurement value of the colorimetric patch area measured by the colorimetric device into an intermediate parameter that does not undergo a scale change due to concentration fluctuation, and for estimating, based on the intermediate parameter and the internal parameter, reproduced colors of the image forming apparatus, wherein:

from a color attribute value included in the patch color characteristic measured by the colorimetric unit, the estimating unit, estimates phase, amplitude, and offset of a color attribute fluctuation component of a basic color synchronizing with a particular cycle, and corrects the intermediate parameter obtained by conversion from a patch input value of the colorimetric patch area.

11. The apparatus according to claim 10, wherein the intermediate parameter is either one of a concentration value of each color and a color difference with respect to a paper surface.

12. The apparatus according to claim 11, wherein the colorimetric chart is formed over a plurality of pages, and the estimating unit estimates phase, amplitude, and offset of the color attribute fluctuation component based on a measurement value of the patch column in the plurality of pages.

* * * * *